US007844705B2

(12) United States Patent
Jones et al.

(10) Patent No.: US 7,844,705 B2
(45) Date of Patent: Nov. 30, 2010

(54) NETWORKED IMAGE VISUALIZATION IMAGE QUALITY ENHANCEMENT METHOD AND SYSTEM

(75) Inventors: Cheryl Ruth Jones, Hubertus, WI (US); Toan T. Le, Germantown, WI (US); Rakesh Mohan Lal, Irving, TX (US); Saad Ahmed Sirohey, Pewaukee, WI (US); David Charles Mack, Waukesha, WI (US)

(73) Assignee: General Electric Company, Schenectady, NY (US)

(*) Notice: Subject to any disclaimer, the term of this patent is extended or adjusted under 35 U.S.C. 154(b) by 176 days.

(21) Appl. No.: 12/130,773

(22) Filed: May 30, 2008

(65) Prior Publication Data

US 2009/0300167 A1  Dec. 3, 2009

(51) Int. Cl.
*G06F 15/173* (2006.01)
(52) U.S. Cl. .................. 709/224; 709/244; 382/128; 382/305
(58) Field of Classification Search ............. 709/244, 709/224; 382/305, 128
See application file for complete search history.

(56) References Cited

U.S. PATENT DOCUMENTS

| | | | |
|---|---|---|---|
| 6,067,075 A * | 5/2000 | Pelanek ........................ 345/158 |
| 7,103,668 B1 | 9/2006 | Corley et al. |
| 7,151,749 B2 | 12/2006 | Vega-Garcia et al. |
| 7,209,437 B1 | 4/2007 | Hodgkinson et al. |
| 7,580,811 B2 * | 8/2009 | Belden ........................ 702/182 |
| 7,583,861 B2 * | 9/2009 | Hanna et al. ................ 382/305 |
| 7,593,555 B2 * | 9/2009 | Spahn ........................ 382/128 |
| 2002/0114281 A1 * | 8/2002 | Rosu et al. .................. 370/238 |
| 2005/0080330 A1 * | 4/2005 | Masuzawa et al. ......... 600/407 |
| 2005/0238255 A1 * | 10/2005 | Niwa et al. ................. 382/305 |
| 2007/0046966 A1 | 3/2007 | Mussack et al. |

OTHER PUBLICATIONS

"AquariusGATE: Intelligent, Fast DICOM Data Routing," TeraRecon, Inc., http://www.terarecon.com/downloads/products/datasheet_aqgate.pdf (last visited May 30, 2008).

* cited by examiner

*Primary Examiner*—Kyung-Hye Shin
(74) *Attorney, Agent, or Firm*—Fletcher Yoder P.C.

(57) ABSTRACT

A method for managing medical image data transmission between computing devices is disclosed. In one embodiment, the method includes monitoring a plurality of parameters of a computer network that includes a server and a client. The plurality of parameters may include a client resource parameter, a server resource parameter, and a network operating parameter. The disclosed method may also include automatically determining a desired compression level at which to send medical image data to the client based at least in part on the client resource parameter, the server resource parameter, and the network operating parameter. Further, in one embodiment the method may include communicating the medical image data from the server to the client at the desired compression level in response to a client request for the image data. Various other methods, systems, and manufactures are also disclosed.

19 Claims, 4 Drawing Sheets

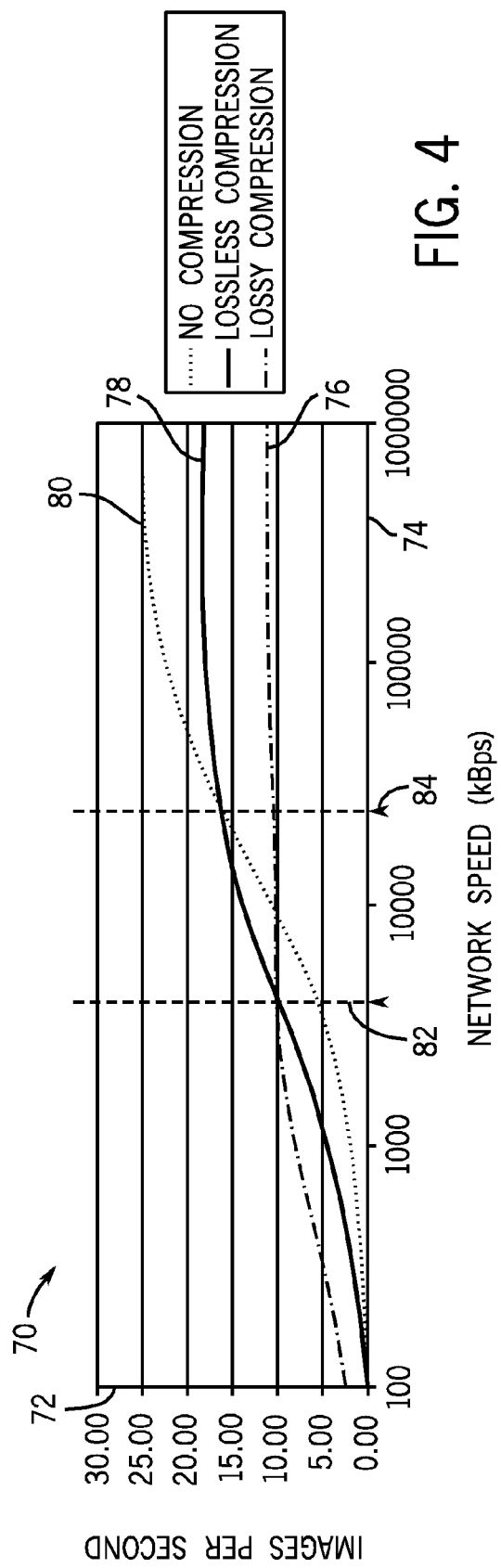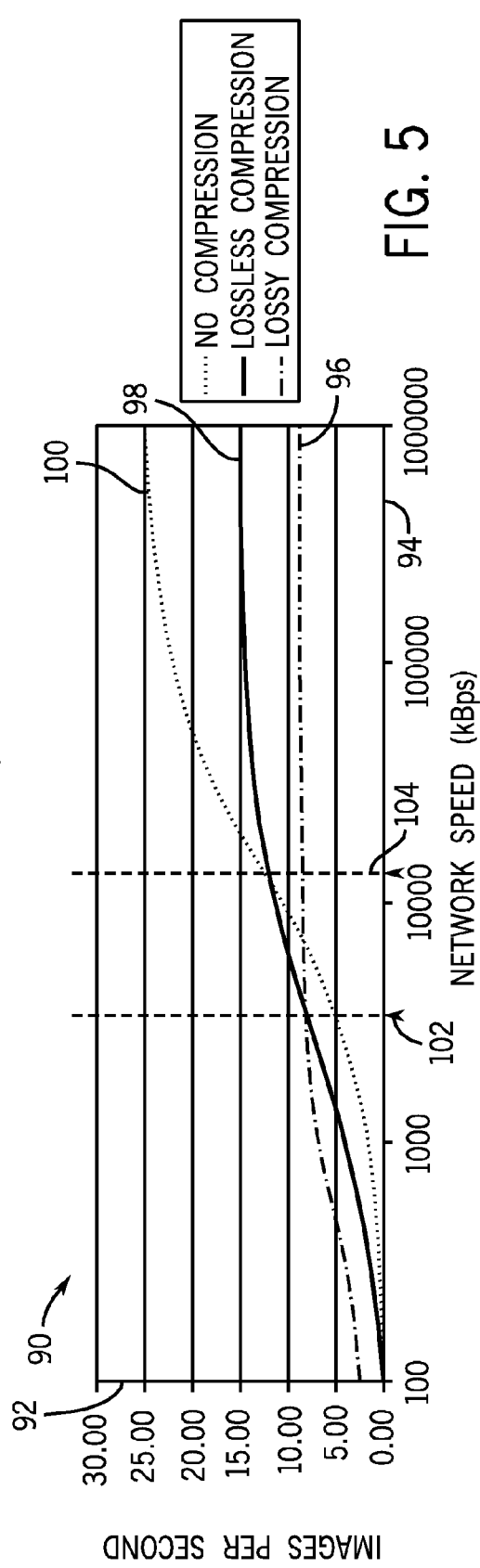

NETWORKED IMAGE VISUALIZATION IMAGE QUALITY ENHANCEMENT METHOD AND SYSTEM

BACKGROUND

The present disclosure relates generally to data transmission techniques. More particularly, the present disclosure concerns a technique for efficiently managing data transfers between networked devices.

The use of computer networks and devices has become widespread, and many of the advantages of such networks and devices are well-known. For instance, these networks and devices allow an increasingly vast amount of data to be electronically stored, transferred, and processed at increasingly rapid speeds. As the storage and processing capabilities of such resources increase, however, the demands that are placed on such resources also increase. For instance, resource-intensive software applications are continuously created to take advantage of the improved capabilities of computing devices, and the size of data files stored and communicated within such networks is similarly rising. This is particularly true of image data files. As imaging technology advances, larger and larger amounts of data are being collected from imaging devices and must typically be stored in a computer hard drive or some other storage medium.

It will be appreciated that, rather than locally storing large data files on any electronic device that may desire access to the data, such data files may be stored at a central location, such as a server or some other centralized storage system, and communicated over a network on an as needed basis. This greatly reduces the need to maintain multiple copies of the same data on different machines, thus reducing the amount of required resources and the cost associated with maintaining electronic data. One drawback to such centralized storage is that the rate at which data may be communicated from one device to another, such as from a server to a client system, is finite and depends on a number of parameters, including the network bandwidth and the size of the communicated data file.

Various lossy and lossless compression techniques have been used to reduce the size of large data files in an attempt to minimize network traffic and to generally reduce the time required to communicate data from a server to a client. While reducing the size of the file through compression may reduce the amount of transit time of the data on the network, this does not always result in a client being able to use the data sooner than if the data were never compressed. Particularly, while the actual transit time may be lessened when the file size is reduced, it may take a significant amount of time for the server to actually compress the data file and for the client to decompress the data file. In some cases, the time required for compressing and decompressing the file may exceed the time saved in communicating a smaller file over a network and, thus, such techniques may actually decrease, rather than increase, network performance in communicating data.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present invention may generally relate to a technique for automatically managing compression levels for data transfer within a networked system. In some embodiments, the technique includes monitoring various characteristics of a server, one or more client devices, and a network allowing communication between the server and client devices, as well as other parameters, such as user preferences and priority levels, to automatically determine and manage optimal compression levels for data communication to each client device. Also, in one embodiment, the determination of the optimal compression level for each client device may be based at least in part on minimizing the cumulative difference between actual and expected data transfer performance for client devices in the networked system or, if the data includes image data, on minimizing the cumulative difference between actual and expected image quality for such client devices.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

DRAWINGS

These and other features, aspects, and advantages of the present invention will become better understood when the following detailed description is read with reference to the accompanying drawings in which like characters represent like parts throughout the drawings, wherein:

FIG. 4 is a graph generally representing the performance of various compression levels over a range of network speeds for a relatively fast client system in accordance with one embodiment of the present invention;

Figure 6:
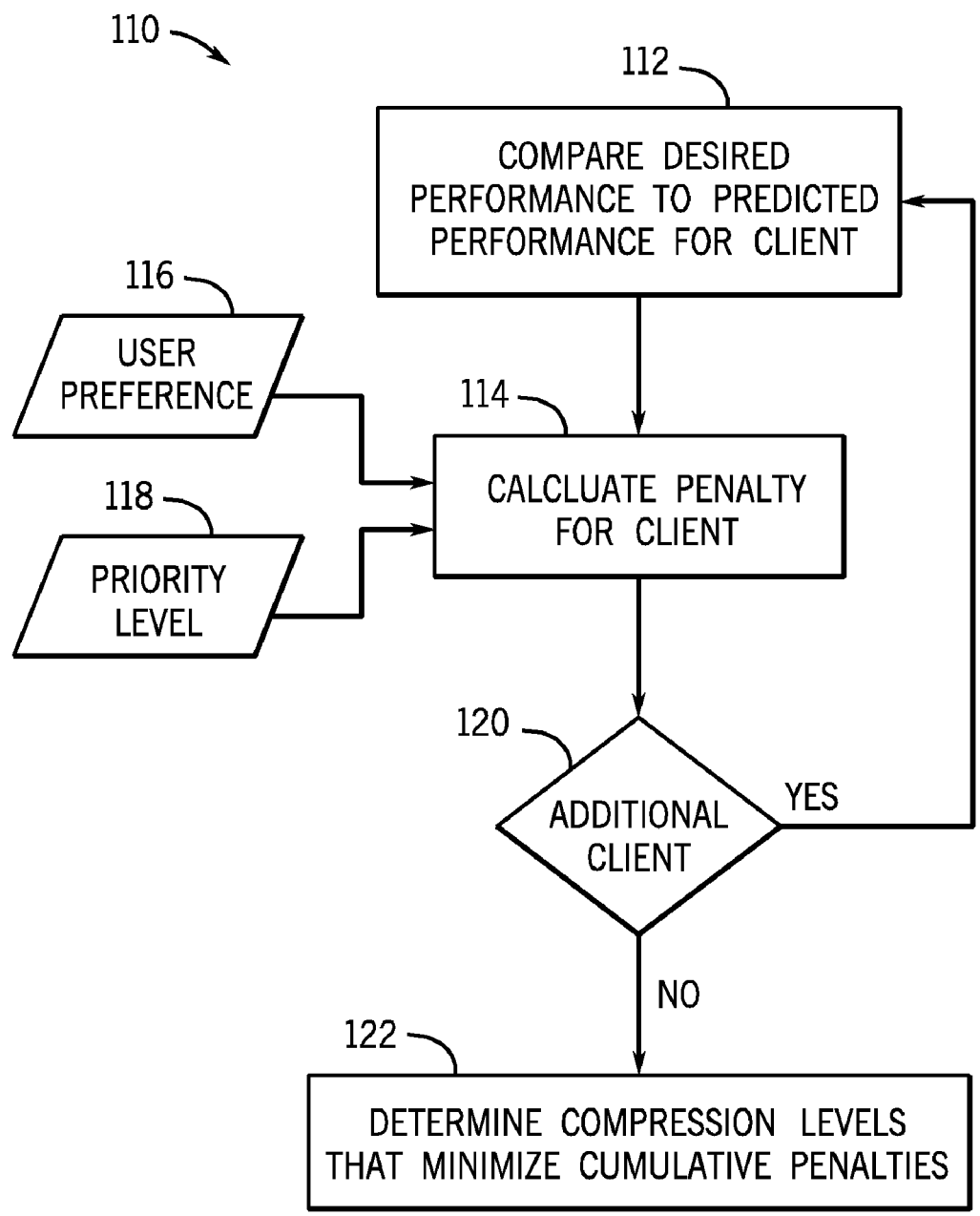

FIG. 5 is a graph generally representing the performance of various compression levels over a range of network speeds for a relatively slow client system in accordance with one embodiment of the present invention; and FIG. 6 is a flow diagram generally representing various steps for determining an optimal combination of client-specific compression levels in accordance with one embodiment of the present invention.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed technique, it will be appreciated that these examples are illustrative in nature and that the term "exemplary" is not used herein to denote any preference or requirement with respect to a disclosed aspect or embodiment. Further, any use of the terms "top," "bottom," "above," "below," other positional terms, and variations of these terms is made for convenience, but does not require any particular orientation of the described components.

Figure 1:
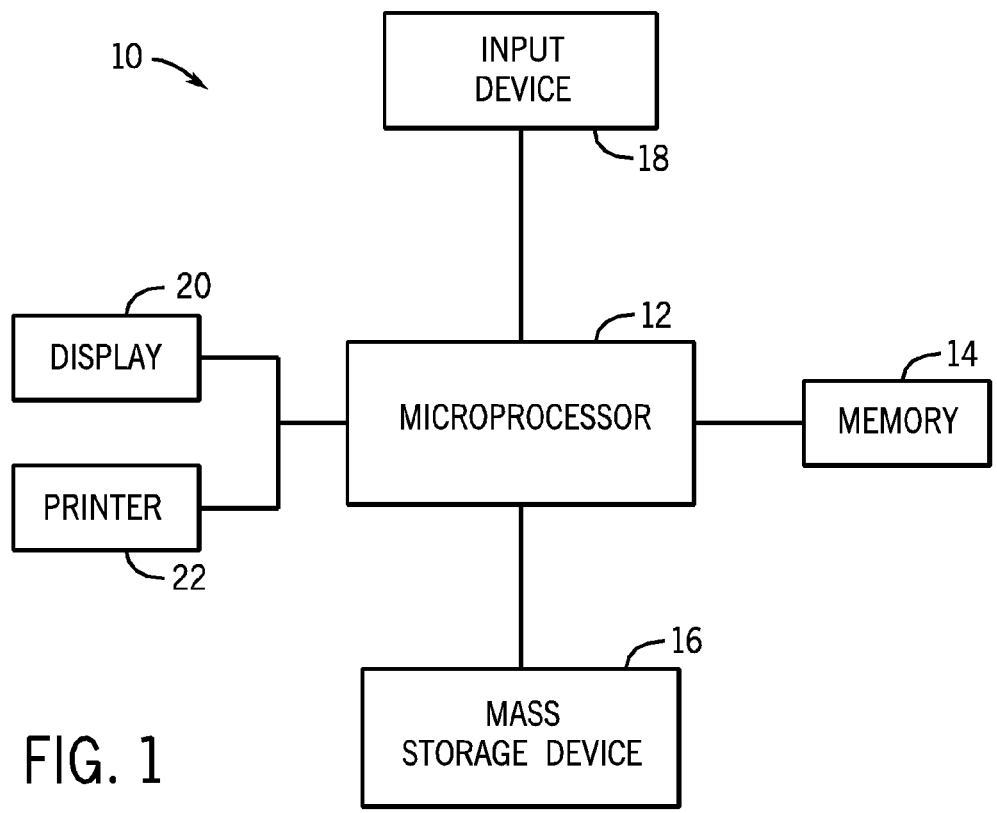
FIG. 1 is a block diagram of an exemplary processor-based device or system in accordance with one embodiment of the present invention.

Turning now to the drawings, and referring first to FIG. 1, an exemplary processor-based system 10 for use in conjunction with the present technique is depicted. In one embodiment, the exemplary processor-based system 10 is a general-purpose computer, such as a personal computer, configured to run a variety of software, including software implementing all or part of the present technique. Alternatively, in other embodiments, the processor-based system 10 may comprise, among other things, a mainframe computer, a distributed computing system, or an application-specific computer or workstation configured to implement all or part of the present technique based on specialized software and/or hardware provided as part of the system. Further, the processor-based system 10 may include either a single processor or a plurality of processors to facilitate implementation of the presently disclosed functionality.

In general, the exemplary processor-based system 10 includes a microcontroller or microprocessor 12, such as a central processing unit (CPU), which executes various routines and processing functions of the system 10. For example, the microprocessor 12 may execute various operating system instructions as well as software routines configured to effect certain processes and stored in or provided by a manufacture including one or more non-transitory computer readable-media, such as a memory 14 (e.g., a random access memory (RAM) of a personal computer) or one or more mass storage devices 16 (e.g., an internal or external hard drive, a solid-state storage device, CD-ROM, DVD, or other storage device). In addition, the microprocessor 12 processes data provided as inputs for various routines or software programs, such as data provided as part of the present technique in computer-based implementations.

Such data may be stored in, or provided by, the memory 14 or mass storage device 16. Alternatively, such data may be provided to the microprocessor 12 via one or more input devices 18. As will be appreciated by those of ordinary skill in the art, the input devices 18 may include manual input devices, such as a keyboard, a mouse, or the like. In addition, the input devices 18 may include a network device, such as a wired or wireless Ethernet card, a wireless network adapter, or any of various ports or devices configured to facilitate communication with other devices via any suitable communications network, such as a local area network or the Internet. Through such a network device, the system 10 may exchange data and communicate with other networked electronic systems, whether proximate to or remote from the system 10.

Results generated by the microprocessor 12, such as the results obtained by processing data in accordance with one or more stored routines, may be provided to an operator via one or more output devices, such as a display 20 and/or a printer 22. Based on the displayed or printed output, an operator may request additional or alternative processing or provide additional or alternative data, such as via the input device 18. As will be appreciated by those of ordinary skill in the art, communication between the various components of the processor-based system 10 may typically be accomplished via a chipset and one or more busses or interconnects which electrically connect the components of the system 10.

Figure 2:
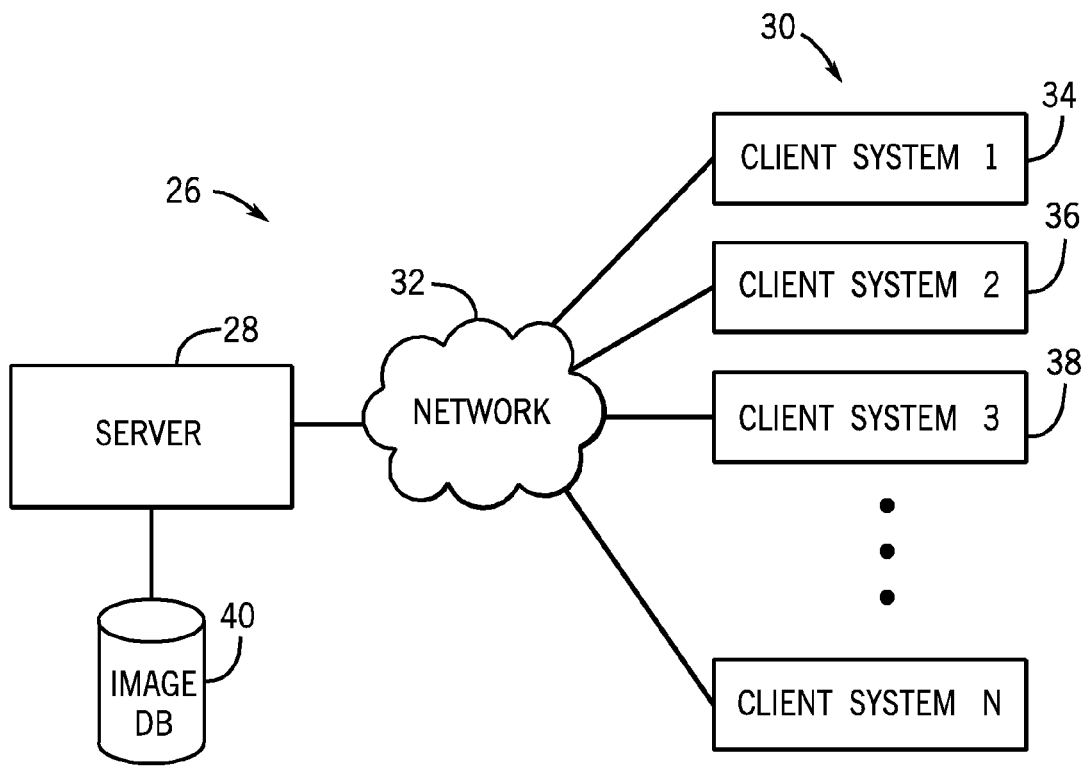
FIG. 2 is a block diagram of an exemplary system for transferring data in accordance with one embodiment of the present invention.

As discussed in greater detail below, the exemplary processor-based system 10, or some other processor-based system, may be configured to automatically manage data transfer between networked computing devices based on various parameters. An exemplary networked system 26 is generally illustrated in FIG. 2 in accordance with one embodiment of the present invention. The system 26 includes a data processing system, such as a server 28, that may communicate with one or more client systems 30 via a network 32. The server 28 may be similar to, or identical to, the processor-based system 10 discussed above, but may take other forms in full accordance with the present technique. Similarly, the client systems 30 may also include computing systems or other processor-based devices, such as computer workstations, and are generally configured to receive data from the server 28.

In some embodiments, the client systems 30 may include systems or devices that request data from the server 28 and may be generally termed "thin" clients, "thick" clients, "hybrid" clients, or some combination thereof. It will be appreciated that a thin client may typically have lower hardware specifications (e.g., less processing power or memory resources) than a thick client. It should be noted, however, that some thin clients may have sufficient computing resources (e.g., processing resources and memory resources) to undertake significant computing tasks independent of the server 28, and that thick clients may, in some cases, benefit from processing performed by the server 28.

It will be further appreciated that the network 32 may include a variety of devices or components that facilitate communications between the server 28 and the client systems 30, such as routers, switches, network cables, network adapters, intermediate computers, or the like, and may include one or more local area networks, wide area networks, and so forth. For instance, in one embodiment, the network 32 may include the Internet. The server 28 may located in the same facility as one or more of the client systems 30, or may be located remote from each of the client systems 30.

In the presently illustrated embodiment, the client systems 30 include individual client systems 34, 36, and 38. While particular client systems 34, 36, and 38 are discussed herein for explanatory purposes, it is noted that other embodiments may include any number of client systems in full accordance with the present technique. Indeed, in one embodiment, an exemplary system 26 may include only a single client system 30, rather than a plurality of such systems.

The exemplary server 28 is configured to facilitate distribution of data to the client systems 30. In one embodiment, the server 28 may access and distribute image data, such as medical images obtained through use of an imaging modality, from an image database 40 that may include any number of stored images. It will be appreciated, however, that other forms of data, including non-image data, executable applications, and so forth, may likewise be transferred to the client systems 30 in full accordance with the present technique. The data to be transferred may be stored locally at the server 28, may be remotely accessed by the server 28 from some other storage medium, or the server 28 may instruct another computing device to transfer data to one or more of the client systems 30.

Figure 3:
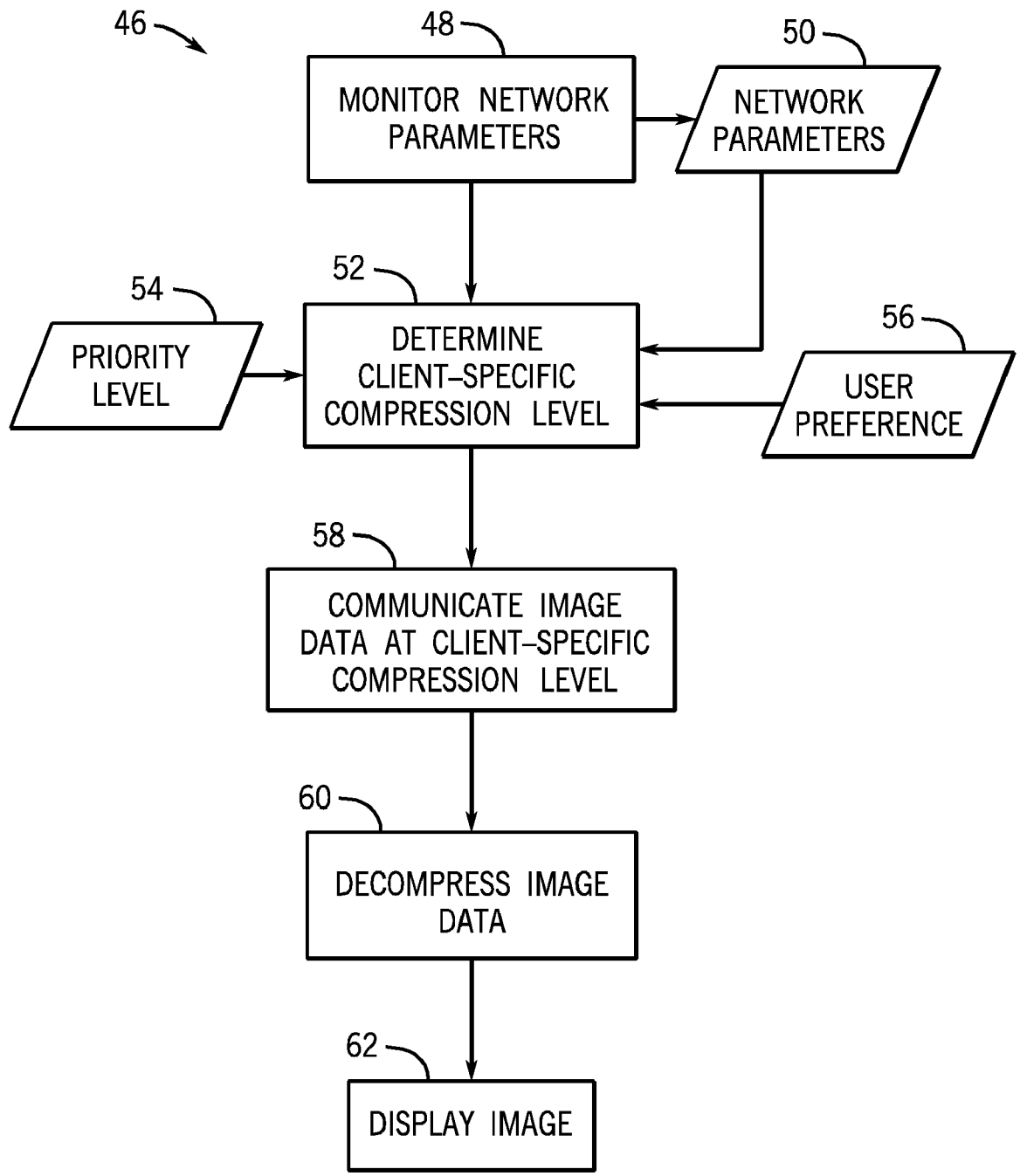
FIG. 3 is a flow diagram of various steps of an exemplary method for managing data transfers in a system, including determining a client-specific compression level and transferring data at that compression level, in accordance with one embodiment of the present invention.

As noted above, the speed with which the server 28 may transfer data to each of the client systems 30 depends on a number of factors. Accordingly, an exemplary method 46 for managing data communications between the server 28 and the one or more client systems 30, which considers such factors in determining optimal data compression levels, is illustrated in FIG. 3 in accordance with one embodiment of the present invention. The method 46 includes a step 48 of monitoring various network parameters 50. As the server 28 and the one or more client systems 30 may generally be considered a part of the networked system 26, the network parameters 50 may generally include a number of parameters regarding, among other things, communication speeds between the server 28 and each of the client systems 30, as well as operating resource parameters of the server 28 and the client systems 30. In one embodiment, the monitored network parameters 50 may include the connection speed capability of each client system 30 and the server 28, the hardware capabilities or available resources (e.g., processor speed, processor utilization, available memory, or the like) of each client system 30 and the server 28, the network throughput or bandwidth, and so forth.

In step 52 of the method 46, a compression level may be determined for data transfer to each client system 30. In one embodiment, an optimal compression level for each client is determined based at least in part on the network parameters 50. For example, based on the monitored parameters 50, the server 28 or some other computing device may calculate an expected or predicted data transfer and processing rate for various available compression schemes, such as those in which the data is compressed via one or more lossy compression techniques or rates, is compressed via one or more lossless compression techniques, or is not compressed at all. The computing device may then select a desired compression level or technique from the plurality of potential compression levels or techniques (e.g., the compression level that provides the highest transfer speed, the compression level that offers the best combination of image quality and transfer speed, or the like). It should also be noted that the present technique may employ any suitable compression methods. Still further, it will be appreciated that the parameters 50 may be repeatedly or continuously monitored, and that the optimal compression level may be recalculated based on changes in the parameters. For instance, a sudden decrease in available resources at the server 28 or a client system 30 may result in a different optimal compression level, and the system 26 may automatically detect such a change and select the newly optimal compression level for further data transfer to the particular client system 30.

For example, if the communication bandwidth between the server 28 and the client system 34 is high, a relatively low level of compression, or no compression, may be desirable, thus reducing load on the server 28 and the client system 34 (as these systems would use fewer processing and memory resources to compress and decompress the data). Alternatively, on a slow network connection in which the network 32, rather that the server 28 or the client system 34, is the largest bottleneck, a relatively high level of compression may be desirable. It will be appreciated, however, that the compression rate or technique may be varied based on numerous other parameters, including those discussed above.

By way of further example, in one embodiment, the client system 34 may be a relatively fast computing system having greater processing speed and available memory resources than a relatively slow client system 36. Graphs generally representing the predicted transfer rate of dynamic images (i.e., a series of images, such as a video sequence or a sequence images browsed by a user) at various compression levels with respect network bandwidth for the client systems 34 and 36 are provided in FIGS. 4 and 5, respectively. While some embodiments may be described with respect to compression levels and performance for transmission of dynamic images, the use of the present technique for determining compression levels for static images is also envisaged. Indeed, in one embodiment, a user of a client system may switch between a dynamic-display mode, in which video or some other series of images are displayed in sequence, and a static-display mode for viewing static images. Further, in such an embodiment, the system 26 may use a first optimal compression level for transferring one or more images when a user is viewing dynamic images and a second, different, optimal compression level (e.g., a compression level, such as no compression or lossless compression, that provides a better image quality) when the user changes to the static-display mode. Additionally, it will be appreciated that the graphs of FIGS. 4 and 5 are provided merely for explanatory purposes, and that the expected performance of each of these compression levels or other, non-depicted compression levels or techniques, will depend on a number of network parameters, such as those discussed elsewhere herein.

Particularly, FIG. 4 graphically represents the expected rate at which dynamic images would be received from the server 28 at a relatively fast client system 34 for each compression level or technique, while a similar graph is provided for a relatively slow client system 36 in FIG. 5. The graph 70 of FIG. 4 includes axes 72 and 74, which generally correspond to the number of images per second that may be rendered on a display device of the client system 34 based on, among other things, the network speed, capabilities of the server 28 and the client system 34, and various compression levels 76, 78, and 80. As illustrated in the graph 70, curve 76 generally indicates rendering performance that may be expected using an exemplary lossy compression technique or level, curve 78 generally indicates expected performance of an exemplary lossless compression technique or level, while curve 80 generally indicates the expected performance if no compression were to be used. For the relatively high speed client system 34, it is noted that the lossy compression level may be the optimal compression level at relatively low network speeds below a first threshold 82. Further, the exemplary lossless compression scheme may deliver optimal performance between network speed thresholds 82 and 84, while the optimal compression level beyond the network speed threshold 84 may be no compression at all.

Similarly, the graph 90 of FIG. 5, which is associated with a relatively low speed client system 36, includes axes 92 and 94 that represent the image rendering performance of the client system 36 at various network speeds and compression levels or techniques. Similar to the curves above, the curve 96 may represent expected performance for lossy compression of the data, the curve 98 may indicate the performance expected with respect to a lossless compression technique, while the curve 100 may indicate performance of the system when the data is not compressed at all. It is noted that lossy compression may be the optimal level below a network speed threshold 102, that no compression may be optimal at relatively high network speeds above a network speed threshold 104, while a lossless compression technique may be optimal between the thresholds 102 and 104. It may be observed, however, that, given the lower amount of computing and/or memory resources of the client system 36 in comparison to the client system 34, and the additional time it would take for the client system 36 to process and to decompress the data, that one or both of the thresholds 102 and 104 may be lower than the thresholds 82 and 84. In other words, the network speed at which optimality switches between different compression techniques or levels for a given system will typically depend on available computing resources of both the given system and the server distributing the data.

Returning to FIG. 3, it is further noted that, in addition to consideration of network parameters 50, determination of client specific compression levels may also be based on a user or client priority level 54. For example, in an image data transfer context, a user who will only briefly review the transferred image data may be more concerned with the transfer speed of the image data, while another user may prioritize image quality over speed. It will be appreciated that users or clients may be prioritized based on any desired characteristic, such as location, user type, workflow, function, other classification, or the like. Consequently, in some embodiments, the priority level 54 may be assigned, automatically or manually, to each client system 30 or user thereof. As a result of these priority levels, users of the same system may receive different levels of performance (e.g., a higher priority user may receive a higher level of performance) even if the network parameters 50 are identical for each user session. Similarly, in other embodiments, two similarly configured client systems simultaneously accessing data from the server 28 may receive different levels of performance based on their respective priority levels 54.

Further, the determination of client-specific compression levels or techniques in step 52 may also be based on one or more user preferences 56. For example, a user of the client system 34 may be willing to sacrifice performance to obtain the highest image quality available, a user of the client system 36 may desire to maximize the speed of the data transfer at the expense of image quality, while a user of the client system 38 may prefer a balance of speed and image quality. As such, in some embodiments, the system 26 may allow users of the client systems 30 to indicate their performance preferences (e.g., speed and/or image quality preferences), and may then consider these preferences in determining the optimal compression level or technique for each client system. For example, a user may be able to select their desired performance level from any suitable number of possible performance levels ranging from "Fastest Performance" to "Highest Image Quality," and each selectable performance level may be associated with a corresponding compression level or technique. It will be appreciated that the system may enable users to express such preferences in any suitable manner, such as through manipulation of a slider bar in a graphical user interface. It should also be noted that, in some embodiments, a priority level 54 or user preference 56 may be considered to set a minimum performance level with respect to speed, image quality, or both, for a given client or user. For instance, a radiologist needing an image to diagnose a patient condition may have a priority level or user preference that signals that image data should be transferred with lossless compression or no compression to ensure the highest possible image quality.

Based on one or more of the network parameters 50, priority levels 54, user preferences 56, or other considerations, the system 26 may automatically set client-specific compression levels for each client system 30, and communicate the data to each client system 30 at its specific compression level in step 58. Once the data is received, each client system 30 may decompress any data that was sent in a compressed format in step 60. Finally, the data received by each client system 30 may be displayed in a respective display device, such as a display 20 (FIG. 1), in step 62.

It will be appreciated that performance of a data transfer system, such as system 26, will typically depend on many factors, including the number of clients requesting data and the capabilities of those clients, in addition to the other parameters discussed above. Further, in some embodiments, it may be generally desirable for the system 26 to provide a certain data transfer performance level with respect to speed, image quality, or both. While the desired performance level may vary by client or user, in at least some cases demand for data may exceed the capabilities of the server, the network, and the clients to maintain desired performance levels. Accordingly, an exemplary method for balancing compression levels for a plurality of client systems 30 is illustrated in FIG. 6 in accordance with one embodiment of the present invention.

Particularly, the exemplary method 110 includes a step 112 of comparing desired performance for a given client system 30 to a predicted performance based on various network parameters, including server and client system parameters, as discussed above. It should be noted that the desired and predicted performances may be based on speed of data transfer, image quality, or some other characteristic. Subsequently, in step 114, a quantitative penalty may be calculated for the particular client system 30 based on the difference between the predicted performance and that desired for the client. For instance, if the predicted performance exceeds the desired performance, the penalty may be considered to be zero, while a shortfall of actual performance in comparison to desired performance may be associated with a penalty based on the magnitude of the shortfall. Additionally, the penalty may be weighted (i.e., modified upwardly or downwardly) based on a user performance preference 116 or a priority level 118 of a client system or user. In this manner, a quantitative penalty may be determined for each client system 30, as generally indicated by decision block 120. The system may then predict the performance of each available compression level or technique for each client system, and the system 26 may determine the optimal set of compression levels that may be used for the different client systems 30 to minimize the cumulative penalties for all client systems 30 in step 122. As noted above, the system 26 may repeatedly or continuously monitor the network for changes in the parameters on which the predicted performance levels are based, and automatically adjust the compression levels based on any resulting changes in the individual or cumulative penalties discussed above.

If the number of client systems 30 is relatively small, the system 26 may directly calculate the predicted performance for all combinations of available compression levels (and techniques) and client systems 30. In other embodiments, however, mathematical optimization techniques, such as simulated annealing or linear/dynamic programming, may be employed to compute the optimal combination of compression settings for the various client systems 30. In this manner, the system 26 may determine a combination of client-specific compression levels that optimize collective speed and image quality performance for the entire group of client systems, and communicate the data at the combination of compression levels as discussed above, without requiring manual selection of the compression levels to be used. Based on the foregoing, one skilled in the art may appreciate that the technical effect of the presently disclosed subject matter includes, among other things, the automatic and efficient management of data transfers at optimal compression levels.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
 a memory device including a database having a plurality of medical images; and
 a server including a processor communicatively coupled to the database, wherein the server is configured to access a medical image from the plurality of medical images; to determine an optimal compression level for the medical image based at least in part on the hardware resources available at the server to compress the medical image, on the hardware resources available at a client requesting the medical image to decompress the medical image, and on at least one of a user priority level or a user performance preference; and to communicate the medical image to the client at the optimal compression level; wherein determining the optimal compression level comprises: comparing, for each of a plurality of clients, a desired medical image transmission performance metric to a predicted medical image transmission performance metric at a given compression level; computing a penalty for each client based on the comparison; and determining a desired compression level for each respective client that minimizes the sum of the penalties for the plurality of clients.

2. The system of claim 1, wherein the server is configured to determine the optimal compression level for the medical image based at least in part on both the user priority level and the user performance preference.

3. The system of claim 1, wherein the server is configured to communicate the medical image to the client at a first optimal compression level while the client is in a dynamic-display mode and to communicate the medical image to the client at a second optimal compression level upon switching of the client from the dynamic-display mode to a static-display mode.

4. The system of claim 1, wherein the optimal compression level is lossless compression or no compression.

5. The system of claim 1, wherein the server is configured to determine the optimal compression level at least in part by selecting the optimal compression level from a plurality of provided compression levels.

6. The system of claim 1, comprising the plurality of clients.

7. The system of claim 1, wherein the server comprises the memory device.

8. A method comprising:
 monitoring a plurality of parameters of a computer network that includes a server and a client, wherein the plurality of parameters include a client hardware resource parameter, a server hardware resource parameter, and a network operating parameter;
 automatically determining a desired compression level at which to send medical image data to the client based at least in part on the client hardware resource parameter, the server hardware resource parameter, and the network operating parameter, wherein the computer network includes the server and a plurality of clients, and automatically determining the desired compression level comprises: comparing, for each client, a desired medical image transmission performance metric to a predicted medical image transmission performance metric at a given compression level; computing a penalty for each client based on the comparison; and determining a desired compression level for each respective client that minimizes the sum of the penalties for the plurality of clients; and
 communicating the medical image data from the server to the client at the desired compression level in response to a client request for the medical image data.

9. The method of claim 8, wherein automatically determining the desired compression level for a particular client is based at least in part on the respective capabilities of each client of the plurality of clients, the resource utilization of the server, the bandwidth of the computer network, and a priority level assigned to each client.

10. The method of claim 8, wherein computing a penalty for each client includes weighting the penalty based at least in part on an assigned priority level of each client.

11. The method of claim 8, wherein the client hardware resource parameter includes at least one of a client processor speed parameter, a client processor utilization parameter, a client available memory parameter, or a client network connection speed parameter.

12. The method of claim 8, wherein the server hardware resource parameter includes at least one of a server processor utilization parameter or a server available memory parameter.

13. The method of claim 8, wherein the network operating parameter includes a network bandwidth parameter.

14. The method of claim 8, wherein automatically determining the desired compression level is based at least in part on a user preference received at the server from the client, the user preference including at least one of an image quality preference or a speed preference.

15. The method of claim 8, wherein the desired compression level comprises a lossy compression level when the communication speed between the server and the client is below a first threshold, comprises lossless compression when the communication speed is between the first threshold and a second threshold, and comprises no compression when the communication speed is above the second threshold, and wherein the first and second thresholds are based at least in part on the server resource parameter or the client resource parameter.

16. The method of claim 8, comprising communicating additional data from the server to the client at the desired compression level.

17. A manufacture comprising:
 a non-transitory computer-readable medium having executable instructions stored thereon, the executable instructions comprising:
 instructions adapted to monitor a plurality of parameters of a computer network that includes a server and a plurality of clients, wherein the plurality of parameters include a client hardware resource parameter, a server hardware resource parameter, and a network operating parameter;
 instructions adapted to automatically determine a desired compression level at which to send medical image data to the client based at least in part on the client hardware resource parameter, the server hardware resource parameter, and the network operating parameter, wherein the instructions adapted to automatically determine the desired compression level comprise instructions adapted to: compare, for each client, a desired medical image transmission performance metric to a predicted medical image transmission performance metric at a given compression level; compute a penalty for each client based on the comparison; and determine a desired compression level for each respective client that minimizes the sum of the penalties for the plurality of clients; and instructions adapted to communicate the medical image data from the server to the client at the desired compression level in response to a client request for the medical image data.

18. The manufacture of claim 17, wherein the non-transitory computer-readable medium comprises a plurality of computer-readable media at least collectively having the executable instructions stored thereon.

19. The manufacture of claim 17, wherein the executable instructions include instructions adapted to automatically determine a desired compression level based at least in part on a user priority level or a user performance preference.

* * * * *